US011113085B2

(12) United States Patent
Zhang et al.

(10) Patent No.: US 11,113,085 B2
(45) Date of Patent: Sep. 7, 2021

(54) VIRTUAL NETWORK ABSTRACTION

(71) Applicant: Nicira, Inc., Palo Alto, CA (US)

(72) Inventors: Bolt Zhang, Beijing (CN); Jianjun Shen, Beijing (CN); Jianwei Ma, Beijing (CN); Donghai Han, Beijing (CN); Ram D. Singh, San Jose, CA (US); Frank Pan, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 520 days.

(21) Appl. No.: 15/006,072

(22) Filed: Jan. 25, 2016

(65) Prior Publication Data

US 2017/0093754 A1 Mar. 30, 2017

Related U.S. Application Data

(60) Provisional application No. 62/234,678, filed on Sep. 30, 2015.

(51) Int. Cl.
*G06F 9/455* (2018.01)
*H04L 12/46* (2006.01)
(Continued)

(52) U.S. Cl.
CPC ...... *G06F 9/45558* (2013.01); *H04L 12/4641* (2013.01); *H04L 45/46* (2013.01);
(Continued)

(58) Field of Classification Search
CPC ......... G06F 9/4558; G06F 2009/45595; H04L 45/46; H04L 45/64; H04L 47/781; H04L 47/787; H04L 12/4641
See application file for complete search history.

(56) References Cited

U.S. PATENT DOCUMENTS 7,343,410 B2    3/2008   Mercier et al.
8,091,086 B1 *   1/2012   Ershov ............... G06F 9/45545
                                                    718/1
(Continued)

FOREIGN PATENT DOCUMENTS

JP      2010161473 A    7/2010
WO    2010103909 A1    9/2010
(Continued)

OTHER PUBLICATIONS

Fernandes, Natalia C., et al., "Virtual Networks: Isolation, Performance, and Trends," Annals of Telecommunications, Oct. 7, 2010, 17 pages, vol. 66, Institut Télécom and Springer-Verlag, Paris, FR.
(Continued)

*Primary Examiner* — Thomas J Dailey
(74) *Attorney, Agent, or Firm* — Adeli LLP

(57) ABSTRACT

A method of defining a virtual network across a plurality of physical hosts is provided. At least two hosts utilize network virtualization software provided by two different vendors. Each host hosts a set of data compute nodes (DCNs) for one or more tenants. The method, at an agent at a host, receives a command from a network controller, the command includes (i) an identification a resource on a tenant logical network and (ii) an action to perform on the identified resource. The method, at the agent, determines the network virtualization software utilized by the host. The method, at the agent, translates the received action into a set of configuration commands compatible with the network virtualization software utilized by the host. The method sends the configuration commands to a network configuration interface on the host to perform the action on the identified resource.

24 Claims, 12 Drawing Sheets

(51) Int. Cl.
  *H04L 12/715* (2013.01)
  *H04L 12/915* (2013.01)
  *H04L 12/911* (2013.01)
(52) U.S. Cl.
  CPC ............ *H04L 45/64* (2013.01); *H04L 47/781* (2013.01); *H04L 47/787* (2013.01); *G06F 2009/45595* (2013.01)

(56) References Cited

U.S. PATENT DOCUMENTS

| | | | |
|---|---|---|---|
| 8,407,689 B2* | 3/2013 | Dournov | G06F 9/45533 717/172 |
| 8,452,921 B1* | 5/2013 | Li | G06F 9/4555 711/112 |
| 9,178,833 B2 | 11/2015 | Koponen et al. | |
| 2006/0026225 A1 | 2/2006 | Canali et al. | |
| 2006/0092976 A1 | 5/2006 | Lakshman et al. | |
| 2007/0239944 A1 | 10/2007 | Rupanagunta et al. | |
| 2010/0153554 A1 | 6/2010 | Anschutz et al. | |
| 2011/0085559 A1 | 4/2011 | Chung et al. | |
| 2011/0261825 A1 | 10/2011 | Ichino | |
| 2012/0120964 A1 | 5/2012 | Koponen et al. | |
| 2012/0158938 A1 | 6/2012 | Shimonishi et al. | |
| 2013/0054761 A1 | 2/2013 | Kempf et al. | |
| 2015/0082300 A1* | 3/2015 | Gokhale | G06F 9/45533 718/1 |
| 2015/0172331 A1* | 6/2015 | Raman | H04L 65/403 709/204 |
| 2015/0195129 A1* | 7/2015 | Nilakantan | G06F 9/45558 709/220 |
| 2015/0249574 A1* | 9/2015 | Zhang | G06F 9/54 709/223 |
| 2015/0309828 A1* | 10/2015 | Shaik | G06F 9/5083 718/1 |
| 2015/0334696 A1* | 11/2015 | Gu | H04L 67/1095 718/1 |
| 2016/0308785 A1 | 10/2016 | Thakkar et al. | |

FOREIGN PATENT DOCUMENTS

| | | |
|---|---|---|
| WO | 2010115060 A2 | 10/2010 |
| WO | 2011013805 A1 | 2/2011 |

OTHER PUBLICATIONS

Kitazume, Hideo, et al., "Network Virtualization Technology for Cloud Services," NTT Technical Review, Dec. 2011, 6 pages, vol. 12 No. 10.

Wang, Wei-Ming, et al., "Analysis and Implementation of an Open Programmable Router Based on Forwarding and Control Element Separation," Journal of Computer Science and Technology, Sep. 2008, 11 pages, vol. 23, No. 5.

* cited by examiner

VIRTUAL NETWORK ABSTRACTION

CLAIM OF BENEFIT TO PRIOR APPLICATIONS

This application claims the benefit of U.S. Provisional Patent Application 62/234,678, filed Sep. 30, 2015. U.S. Provisional Patent Application 62/234,678 is incorporated herein by reference.

BACKGROUND

There are many server virtualization technologies such as VMware ESXi™ Microsoft Hyper-V®, KVM, and Docker, in the market today. Information technology organizations have gained significant benefits as a result of server virtualization. Server virtualization has reduced physical complexity, increased operational efficiency, and provided the ability to dynamically re-purpose underlying resources to meet the needs of business applications.

Many organizations are eager to also have their network virtualized. The same way that server virtualization programmatically creates, snapshots, deletes, and restores software-based virtual machines (VMs), network virtualization programmatically creates, snapshots, deletes, and restores software-based virtual networks. For the network virtualization, every vendor has a different virtual network module such as VMware NSX™, Microsoft Hyper-V® Network Virtualization, KVM network virtualization with OpenVSwitch, etc. It is therefore difficult to setup a virtual network, which can connect VMs on hosts with different kind of hypervisors.

BRIEF SUMMARY

Some embodiments provide a method virtual network abstraction. Different network virtualization software provided by different vendors require different commands to configure difference resources such as logical devices and logical services on a logical network. In a multi-tenant environment, each host may host virtual machines of several tenants. Each host may utilize virtualization software (e.g., a hypervisor) and different network virtualization software.

Configuring a logical network becomes a complex task for a network administrator when the logical network of a tenant includes logical devices and services on several different hosts that utilize different virtualization software and different network virtualization software. The network administrator has to configure the logical network on different hosts by using commands that are recognized by the particular virtualization software/network virtualization software utilized by the host.

Some embodiments provide a high level interface that a network administrator can utilize to send a uniform set of commands to configure a logical network and the associated devices and services without being aware of the particular network utilization software that is used by different hosts on the logical network. These embodiments provide an agent on each host that acts as a translator for the virtual network controllers. The agent provides virtual network abstraction by translating the high level commands that are platform agnostic into a set of configuration commands that are understood by the particular vendor virtualization software that is used by the host. The network administrator is not required to be aware of different configuration commands required by the network virtualization software provided by different vendors.

The agent receives commands from the virtual network controller. The commands include identification of a resource on a tenant logical network and an action to perform on the identified resource. The agent then determines the network virtualization software that is utilized by the host. The agent then translates the received action into a set of configuration commands that are compatible with the network virtualization software utilized by the host. The agent then sends the configuration commands to a network configuration interface on the host to perform the action on the identified the resource.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for virtual network abstraction. The method provides a high level interface that a network administrator can utilize to send a uniform set of commands to configure a logical network and the associated devices and services without being aware of the particular network virtualization software that is used by different hosts on the logical network.

Figure 1:
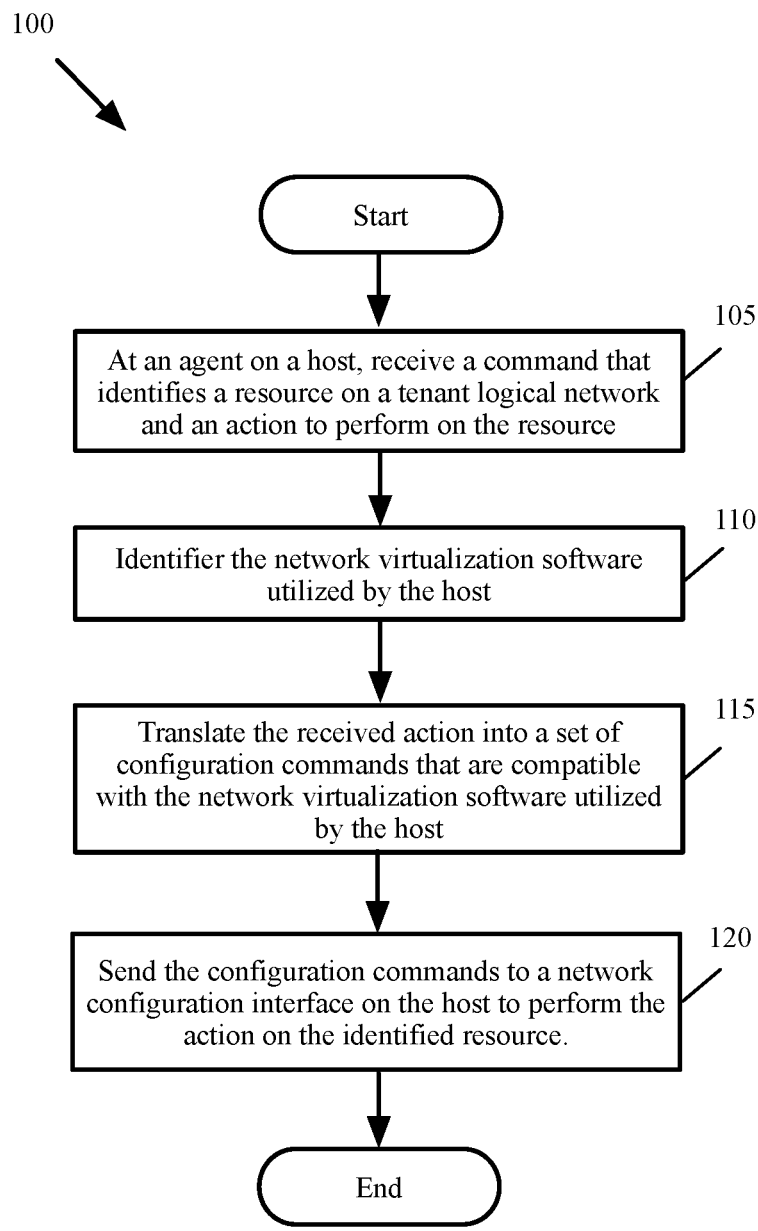
FIG. 1 conceptually illustrates a process for providing virtual network abstraction in some embodiments.

FIG. 1 conceptually illustrates a process 100 for providing virtual network abstraction in some embodiments. The process is performed by an agent on a host in some embodiments. The agent provides virtual network abstraction by receiving high level commands that are platform agnostic from a network controller and translating the commands into a set of configuration commands that are understood by the particular vendor virtualization software used by the host. A network administrator that is utilizing the network controller does not need to be aware of different configuration commands required by the network virtualization software provided by different vendors.

As shown, the process receives (at 105) a command at an agent on the host from a virtual network controller. The command includes the identification of a resource on a tenant logical network and an action to perform on the identified resource. For instance, the command is a request to create a logical router on a tenant logical network or to monitor the status of a virtual firewall on the network.

The process then identifies (at 110) the network virtualization software utilized by the host. Each vendor may have a different virtual network software such as VMware NSX™ Microsoft Hyper-V® Network Virtualization, KVM network virtualization with OpenVSwitch, etc. Each of these network virtualization software have a unique set of commands to configure and monitor the network.

Next, the process translates (at 115) the received action into a set of configuration commands that are compatible with the network virtualization software utilized by the host. Each agent acts as an interface or translator that translates the high-level commands received from the virtual network controller into commands that are understood by the particular network virtualization software used at the host where the agent is located. Each network virtualization software may require a different set of commands to configure and/or monitor different devices and services on the network. The agent hides the details of different virtual network implementations in different hosts and provides an abstract view of the network to the virtual network controller.

The process then sends (at 120) the configuration commands to a network configuration interface on the host to perform the action on the identified the resource. In some embodiments, each vendor provides a network configuration interface (e.g., in the form of a driver) in order to receive commands from the agent and translate them into commands that are understood by the virtualization network platform provided by the vendor. The process then ends.

I. Virtual Network Abstraction

Figure 2:
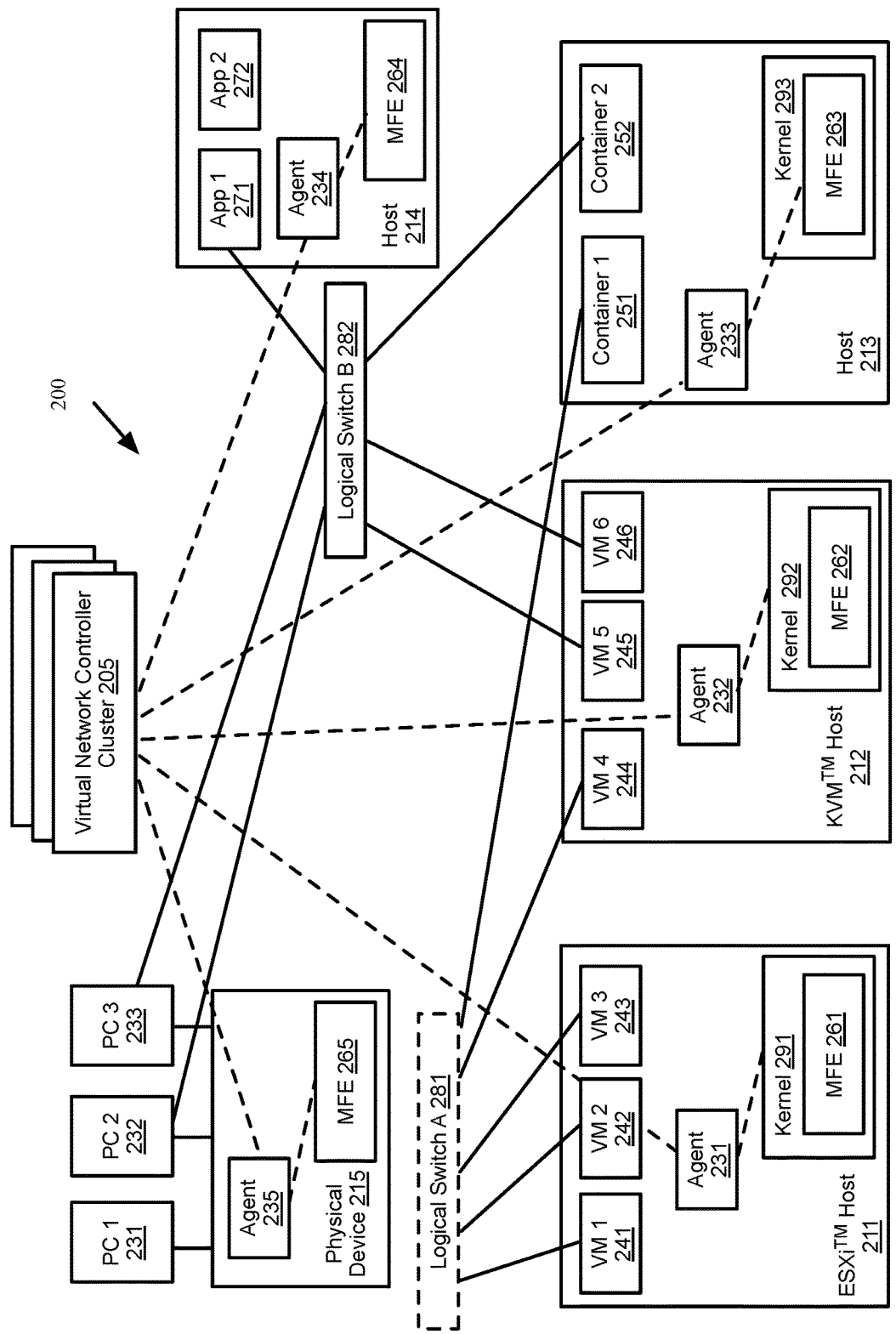
FIG. 2 conceptually illustrates a logical view of a portion of a virtualized network in some embodiments.

FIG. 2 conceptually illustrates a logical view of a portion of a virtualized network in some embodiments. Network virtualization provides a software-based view of the hardware and software networking resources such as logical switches, routers, firewalls, load balancers, and virtual private networks (VPNs) to connected workloads. The virtual networks are programmatically created, provisioned and managed, while the underlying physical networks are responsible for forwarding the packets.

As shown, the logical view of the virtualized network 200 includes a cluster of one or more virtual network controllers 205, physical devices 211-215 and 231-233, logical switches 281-282, virtual machines (VMs) 241-246, containers 251-252, and applications 271-272. Physical devices 211-214 are host machines, which are provided by different vendors.

In this example, host 211 includes VMware ESXi™ virtualization software (or hypervisor) and host 212 includes a kernel-based virtual machine (KVM) virtualization infrastructure. Each host 211-212 includes one or more VMs 241-246. A VM is a software implementation of a machine such as a computer. Host 213 includes several containers 251-252. The containers run on top of the host operating system without the need for virtualization software or separate operating system. Each host 211-213 includes a kernel 291-293. Device 214 is a physical device that communicates with several other physical devices such as personal computers (PCs) 231-233. Host 214 is a physical device that runs several applications 271-272. Physical devices 213-215 do not include a virtualization platform.

The virtualized network 200 supports multi-tenancy. Each host in a multi-tenant environment can include VMs or containers from several different tenants. Each tenant configures a separate logical network (also referred to as private network). The logical network is an abstraction of a physical network and may provide a virtual Layer 2 (L2 or data link layer) for services such as encapsulation and decapsulation of network layer data packets into frames, frame synchronization, medial access control, etc. The logical network may span one or more physical networks and be organized independent of the underlying physical topology and organization of the physical networks.

As shown, each one of physical devices 211-215 includes a managed forwarding element (MFE) 261-265 that operates as a software forwarding element. The MFEs perform packet processing operations such as receiving, forwarding, or dropping the packets. The MFEs operate on physical machines that host VMs or other data compute nodes that serve as the sources and destinations for packets. For example, an MFE might operate on a host machine that hosts VMs for several different logical networks, and would implement the several logical networks for each of the VMs residing on the host. The MFE in some embodiments is configured and managed by a network controller.

In some embodiments, the MFEs implement an overlay network. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

FIG. 2 also shows two logical switches 281-282. Each of these logical switches provides connectivity for the logical network of a different tenant. As shown, VMs 241-244 and container 251 belong to the same tenant and they are connected together through logical switch 281. Similarly, VMs 245-246, container 252, application 271, and physical devices 232-233 belong to one tenant and are connected together through logical switch 282. It should be understood that logical switches 281 and 282 shown in FIG. 2 are conceptual entities. Each logical switch shows a particular tenant's view of the network. The functionalities of the logical switches 281-282 are implemented by MFEs 261-265.

The figure also shows that each physical device 211-215 includes an agent 231-235. Each agent is used to accept commands from the controller cluster 205 and provide interface with the corresponding MFE 261-265. The agent hides the details of different virtual network implementations (that are possibly provided by different vendors) in physical devices 211-215 and provide an abstract view of the network to the virtual controller cluster 205.

Figure 3:
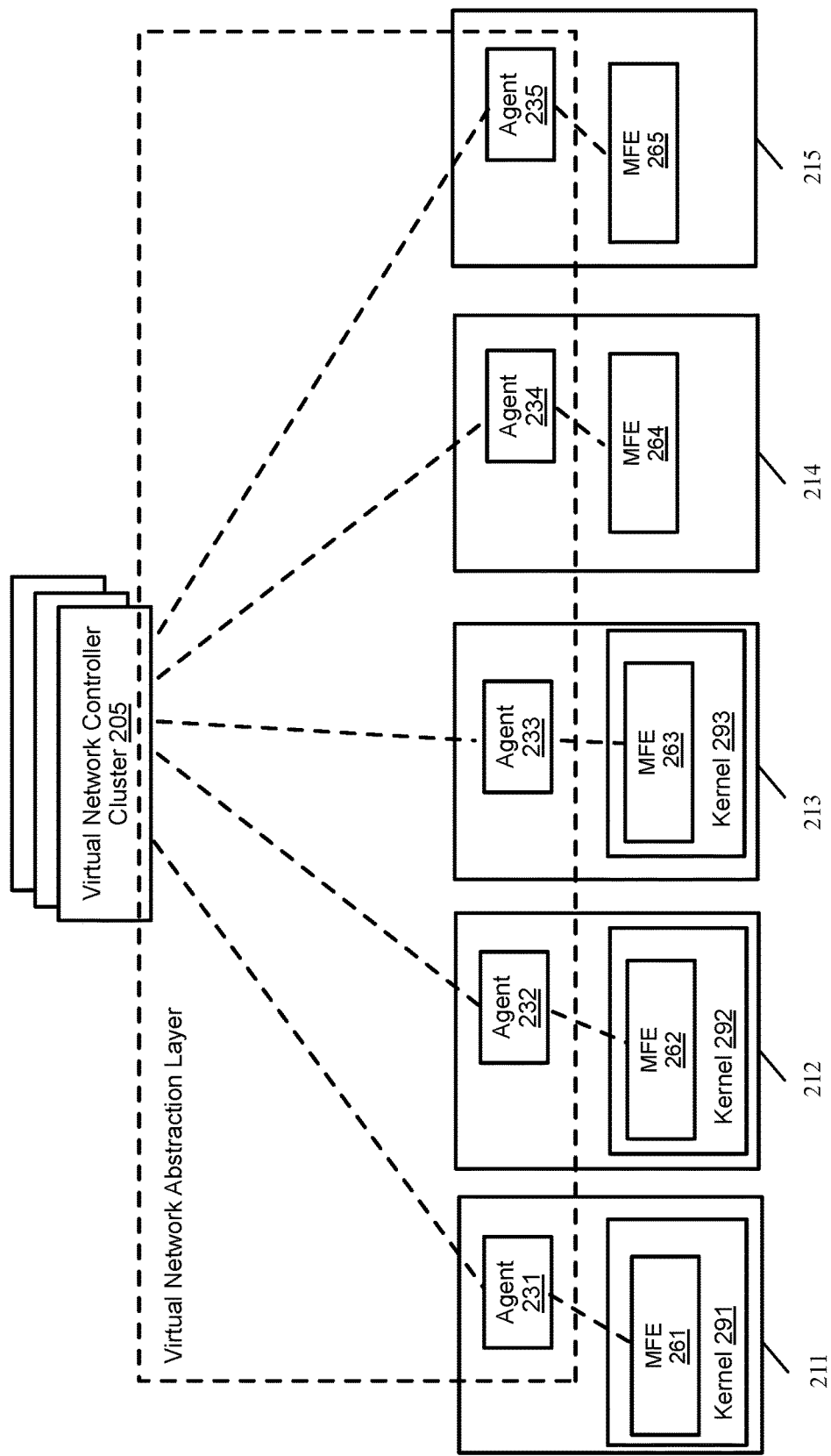
FIG. 3 conceptually illustrates the abstraction layer provided in the virtualized network of FIG. 2.

FIG. 3 conceptually illustrates the abstraction layer provided in the virtualized network of FIG. 2. The abstraction layer isolates the virtual controller cluster from the details of underlying virtual network implementation at each host or device 211-215. A network administrator uses a network controller in the cluster 205 to create, configure, update, delete, or monitor different logical device in the hosts and devices 211-215.

Each agent 231-235 acts as an interface (or translator) that translates the high-level commands from the network controller cluster into commands that are understood by the particular software virtualization and network virtualization used at each host or physical device 211-215. The virtual network abstraction layer allows the use of different schemas and control interfaces to create, configure, update, delete, or monitor different logical devices and services in the host and device 211-2115.

Figure 4:
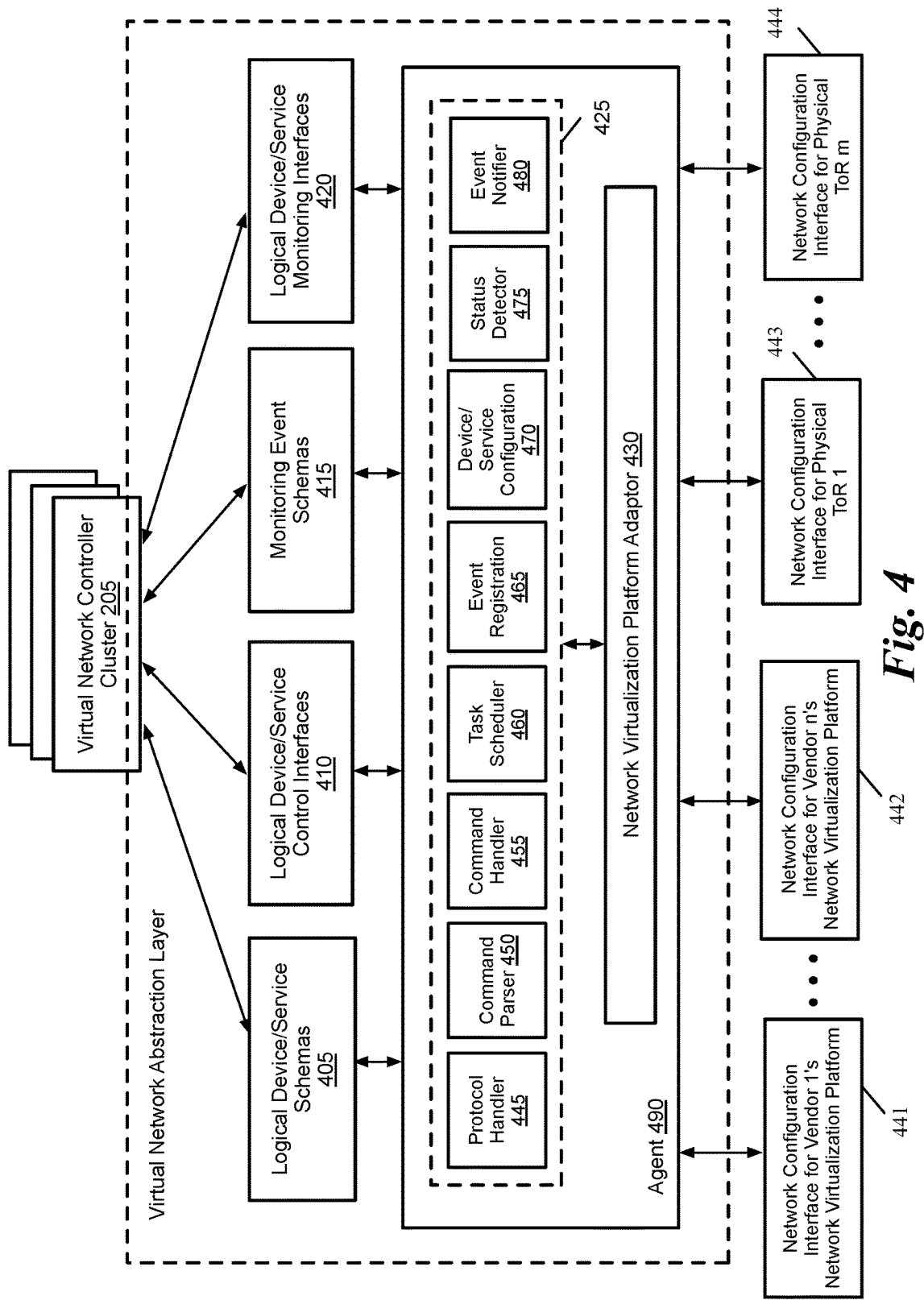
FIG. 4 conceptually illustrates different components that are used to provide network abstraction in some embodiments.

FIG. 4 conceptually illustrates different components that are used to provide network abstraction in some embodiments. As shown, the agent 490 includes several components 445-480 that are common for interfacing with different network virtualization platforms used by different hosts and devices 211-215. The agent also includes a network virtualization platform adaptor 430, which includes a set of customized interfaces used to interact with different network virtualization platforms used by different hosts and devices 211-215.

The protocol handler 445 provides a communication interface between the agent 490 and the virtual network cluster 205. The protocol handler receives commands from and sends responses to the virtual network cluster. The command parser 450 parses the commands received from the network controller cluster and identifies the resources and actions specified in the commands.

The command handler 455 interacts with other components of the agent to perform the required actions. The command handler sends events that the network controller cluster requires to monitor to the event registration 465. The event registration sends the events that require monitoring to the task scheduler 460. The command handler also sends the requested device and services configurations to the device and service configuration component 470 to create commands to configure the devices and services specified by the network controller cluster. The device and service configuration component 470 sends the commands to the task scheduler. The task scheduler 460 schedules different tasks that are required to configure or monitor different devices and services on the virtual network on each host.

The event registration 465 creates commands to register for the events requested by the network controller cluster and sends them to the task scheduler. The event notifier 480 receives event notifications from the devices and services that are being monitored and to send them to the network controller cluster. The status detector 475 receives status of different configured devices and services and reports them to the virtual network cluster. Further details of the operations components 445-480 are provided below.

The agent also has a network virtualization platform adaptor 430. Each host may use a different network virtualization platform provided by different vendors. Each network virtualization platform may require a different set of commands to configure and/or monitor different devices and services on the network. In some embodiments, each vendor provides an interface driver referred herein as network configuration interface in order to receives commands from the agent 490 and translate them into commands that are understood by the virtualization network platform provided by the vendor. The network virtualization platform adaptor 430 in some embodiments provides the customized interface that is required by the agent to interact with different network configuration interfaces 441-444.

The virtual network abstraction layer also provides a set of schemas 405 and 415 and a set of interfaces 410 and 420. The schemas are used by the virtual network controller cluster 205 to define and monitor different logical devices and logical services that a tenant logical network utilizes. The set of interfaces 410 and 420 are used to facilitate communication between the agent 490 and the virtual network cluster 205.

Figure 5:
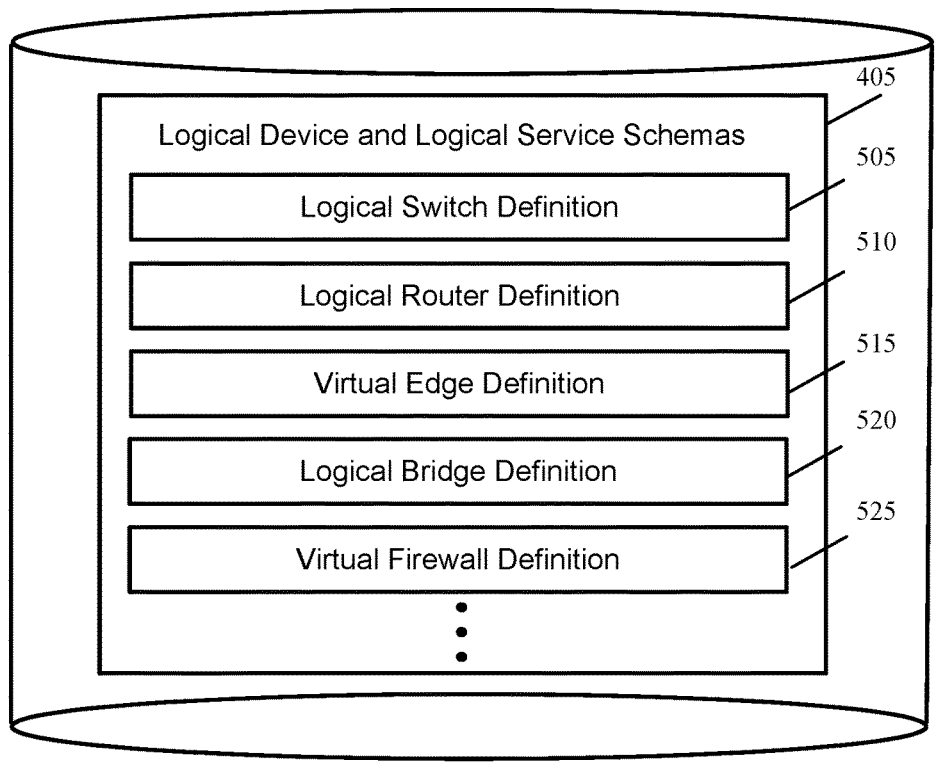
FIG. 5 conceptually illustrates examples of the logical device and logical service schemas that are used in some embodiments.

The logical device and logical service schemas 405 define the structures of different logical devices and logical services that a tenant logical network may utilize. FIG. 5 conceptually illustrates examples of the logical device and logical service schemas that are used in some embodiments. As shown, the logical device and logical service schemas 405 include a logical switch definition schema 505, a logical router definition schema 510, a virtual edge definition schema 515, a logical bridge definition schema 520, a virtual firewall definition schema 525, etc.

Each schema defines the logical structure of a logical device or logical service. Logical switch definition schema 505 defines the behavior of a logical switch. The following is an example of a schema for a logical switch in some embodiments.

```
<logicalSwitch>
    <id>21</id>
    <name>Development Sub Net Switch</name>
    <description> ... </description>
    <ip> ... </ip>
    <mask> ... </mask>
</logicalSwitch>
```

As shown, the logical switch schema defines an identification, a name, and a description for the logical switch. The logical switch also has an Internet protocol (IP) address and a mask that defines the logical switch's network subnet.

A logical router definition schema 510 defines the behavior of a logical router. A logical router connects a set of logical switches. The following is an example of a schema for a logical router in some embodiments.

```
<logicalRouter>
    <id>126</id>
    <name>Router A</name>
    <description>Router between development and testing sub nets</description>
    <distributed>true</distributed>
    <interfaces>
        <interface>
            <id>133</id>
            <name>NIC on Development Sub Net</name>
            <logicalSwitch id="21">
                <ip>192.168.0.253</ip>
                <mask>255.255.255.0</mask>
            </logicalSwitch>
        </interface>
        <interface>
            <id>134</id>
            <name>NIC on Testing Sub Net</name>
            <logicalSwitch id="22">
                <ip>10.1.1.253</ip>
                <mask>255.0.0.0</mask>
            </logicalSwitch>
        </interface>
    </interfaces>
</logicalRouter>
```

As shown, the logical router schema defines an identification, a name, and a description for the logical router. The schema defines the router as a distributed entity and defines a set of interfaces for the router.

A virtual edge definition schema 515 defines the behavior of a virtual edge. A virtual edge is a logical device at the entry of a network. The following is an example of a schema for a virtual edge in some embodiments.

```
<virtualEdge>
    <id>231</id>
    <name>Edge A</name>
    <description>Edge between VPN entry and development network</description>
    <interfaces>
        <physicalInterface>
            <id>nic-6</id>
        </physicalInterface>
        <interface>
            <id>244</id>
            <name>NIC on Development Sub Net</name>
            <logicalSwitch id="21">
                <ip>192.168.0.252</ip>
                <mask>255.255.255.0</mask>
            </logicalSwitch>
        </interface>
    </interfaces>
</virtualEdge>
```

As shown, the virtual edge schema defines an identification, a name, and a description for the virtual edge. The schema also defines a set of interfaces for the logical edge.

A logical bridge definition schema 520 defines the behavior of a logical bridge. The following is an example of a schema for a logical bridge in some embodiments.

```
<logicalBridge>
    <id>286</id>
    <name>Bridge A</name>
    <description>Bridge between virtual network 1 and physical network A</description>
    <interfaces>
        <physicalInterface>
            <id>nic-6</id>
        </physicalInterface>
        <interface>
            <id>291</id>
            <name>Nic on Development Sub Net</name>
            <logicalSwitch id="21">
                <ip>192.168.0.251</ip>
                <mask>255.255.255.0</mask>
            </logicalSwitch>
        </interface>
    </interfaces>
</logicalBridge>
```

As shown, the logical bridge schema defines an identification, a name, and a description for the logical bridge. The schema also defines a set of interfaces for the logical bridge.

A virtual firewall definition schema 525 defines the behavior of a virtual firewall. The following is an example of a schema for a virtual firewall in some embodiments.

```
<virtualFireWall>
    <rule>
        <id>771</id>
        <layer>3</layer>
        <source>*</source>
        <destination>*</destination>
        <service>DHCP-Client</service>
        <action>allow</action>
        <applyTo>all</applyTo>
    </rule>
    <rule>
        <id>774</id>
        <layer>3</layer>
        <source>*</source>
        <destination>*</destination>
        <service>ICMP</service>
        <action>forbid</action>
        <applyTo>
            <virtualDevice>126</virtualDevice>
            <virtualDevice>231</virtualDevice>
        </applyTo>
    </rule>
</virtualFireWall>
```

As shown, the virtual firewall schema defines a set of rules. Each rules has an identification, and defines the network layer, source, destination, service, action, and the devices to which a rule is applied.

Referring back to FIG. 4, the virtual network abstraction layer includes a set of logical device and logical service control interfaces 410. The control interfaces are uses to send commands from the virtual controller cluster 205 to the agent 490 on each host to create, read, update, and delete different logical device and logical services according to each device or service schema.

Figure 6:
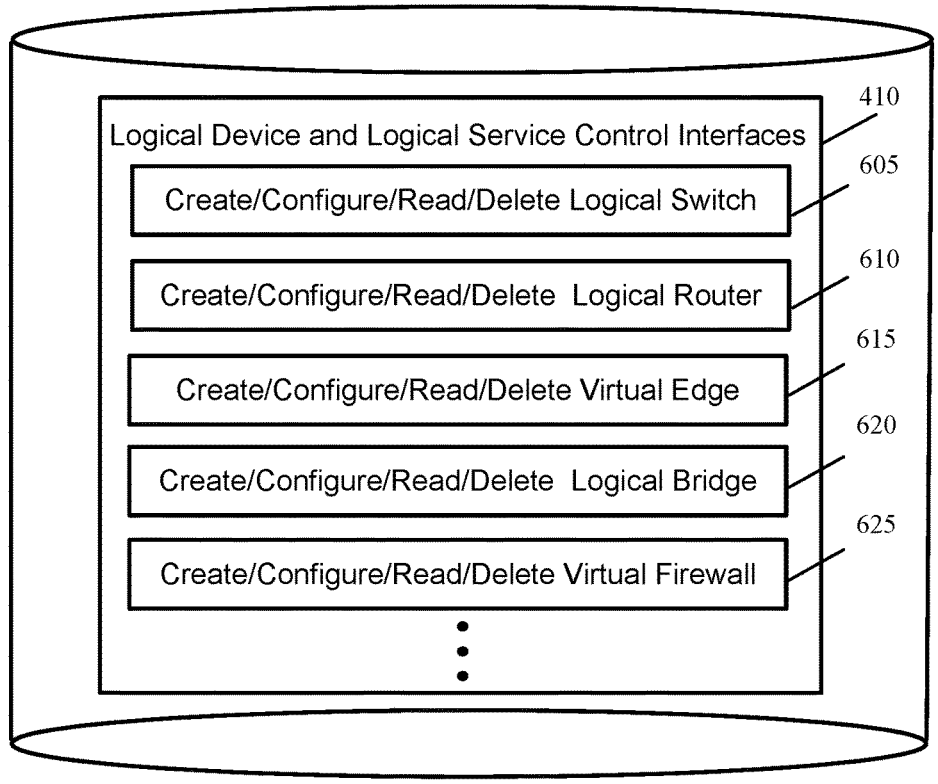
FIG. 6 conceptually illustrates examples application programming interfaces (APIs) provided by the control interfaces in some embodiments.

FIG. 6 conceptually illustrates examples of application programming interfaces (APIs) provided by the control interfaces 410 in some embodiments. As shown, the logical device and logical service control interfaces 410 include a set of APIs 605 for creating, reading, updating, and deleting logical switches. The control interfaces 410 also includes a set of APIs 610 for creating, reading, updating, and deleting logical routers. The control interfaces 410 further includes a set of APIs 615 for creating, configuring, reading, and deleting virtual edges. The control interfaces 410 also includes a set of APIs 620 for creating, reading, updating, and deleting logical bridges. The control interfaces 410 further includes a set of APIs 625 for creating, reading, updating, and deleting virtual firewalls.

Some embodiments utilize a representational state transfer (REST or RESTful) application programming interface (API) that is provided by the agent. In these embodiments, each REST API identifies a resource or a service (such as a logical switch or a logical firewall) by its universal resource identifier (URI) and indicates what action has to be performed on the identified resource or service by using a set of verbs such as GET, PUT, DELETE, etc.

Figure 7:
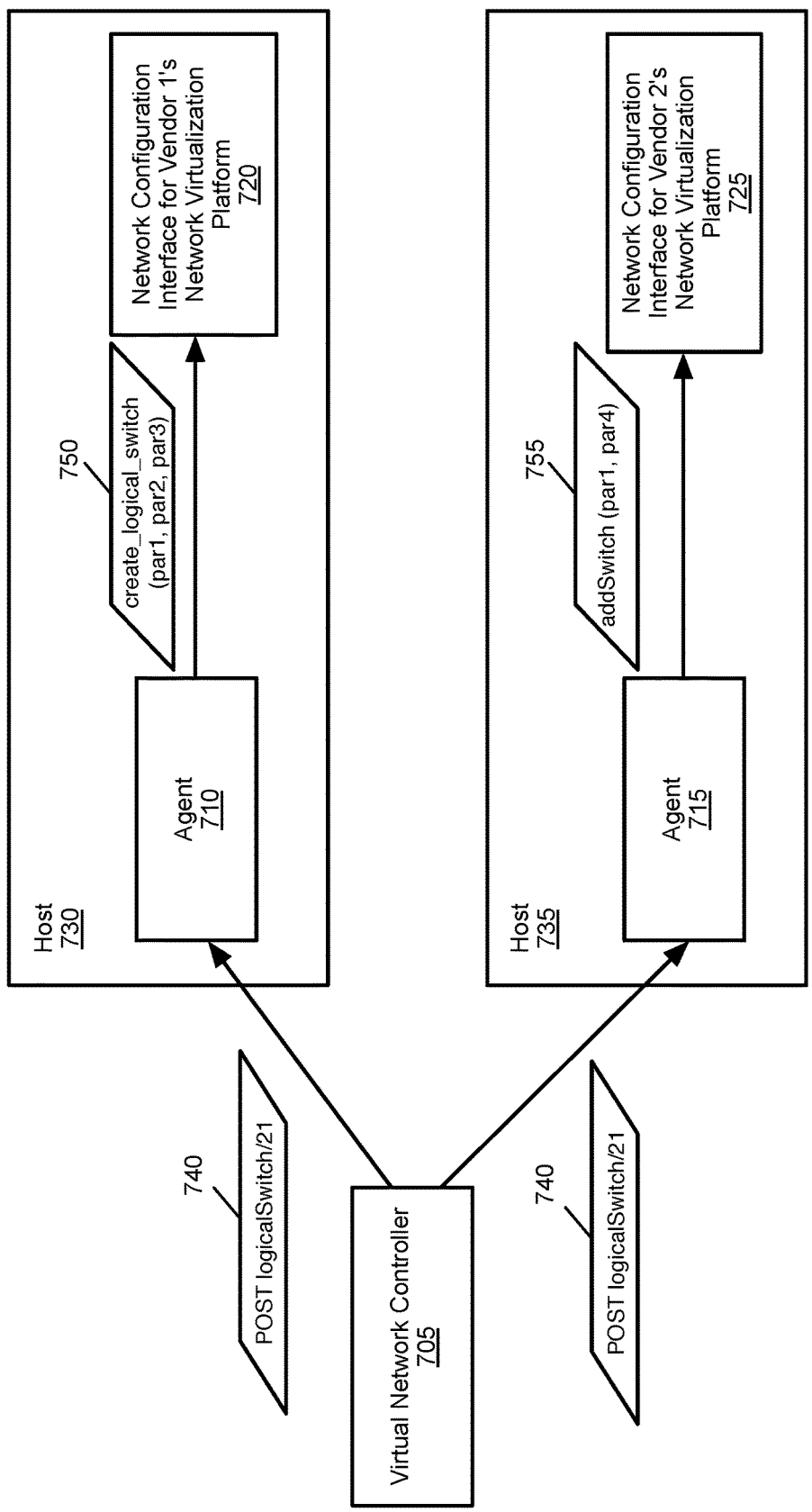
FIG. 7 conceptually illustrates an example of an agent that translates the same command from a virtual network controller into different commands that are recognizable by two different network virtualization platform.

FIG. 7 conceptually illustrates an example of an agent that translates the same command from a virtual network controller into different commands that are recognizable by two different network virtualization platform. As shown, a virtual network controller 705 sends a command to create a logical switch. In this example, the command "POST logicalSwitch/21" requests that an MFE with URI "21" to be created according to a corresponding schema.

Virtual network controller 705 sends the same POST command 740 to two different agents 710-715. Agent 710 operates in host 730, which utilizes a network virtualization platform that is provided by (or procured from) vendor 1. Agent 715 operates in host 735, which utilizes a network virtualization platform that is provided by (or procured from) vendor 2.

As shown in this conceptual example, agent 710 translates command 740 into a command 750, which is recognized by network configuration interface 720 for vendor 1's network virtualization platform. The exemplary command "create_logical_switch (par1, par2, par3)" accepts three parameters par1, par2, and par3 that define different components of the requested MFE (e.g., specific ports and connections required by the MFE).

In contrast, command 740 is translated by agent 715 as command "addSwitch (par1, par4)" 755. The exemplary command 755 uses a different verb than command 750 and requires only two parameters, par1 and par4. Only one of the parameters of the commands 750 and 755 are the same. This example illustrates the role of the agent in each host in providing abstraction for the virtual network controller 705.

A network administrator that is using the virtual network controller 705 to configure the network on different hosts issues high level commands in a uniform format to different hosts. The network administrator does not need to be aware of different configuration commands required by the network virtualization platform provided by different vendors. Instead, the agent in each host translates the high level commands received from the virtual network controller into different commands that are recognized by each network virtualization platform.

Referring back to FIG. 4, the virtual network abstraction layer also includes a set of monitoring event schemas 415. Since actions such as creation, configuration, or deletion of logical devices and logical service may be performed asynchronously, the network controller cluster in some embodiments subscribes to different events for monitoring the status of different devices and services. In some embodiments, the behavior of each event is defined by a corresponding monitoring event schema.

Figure 8:
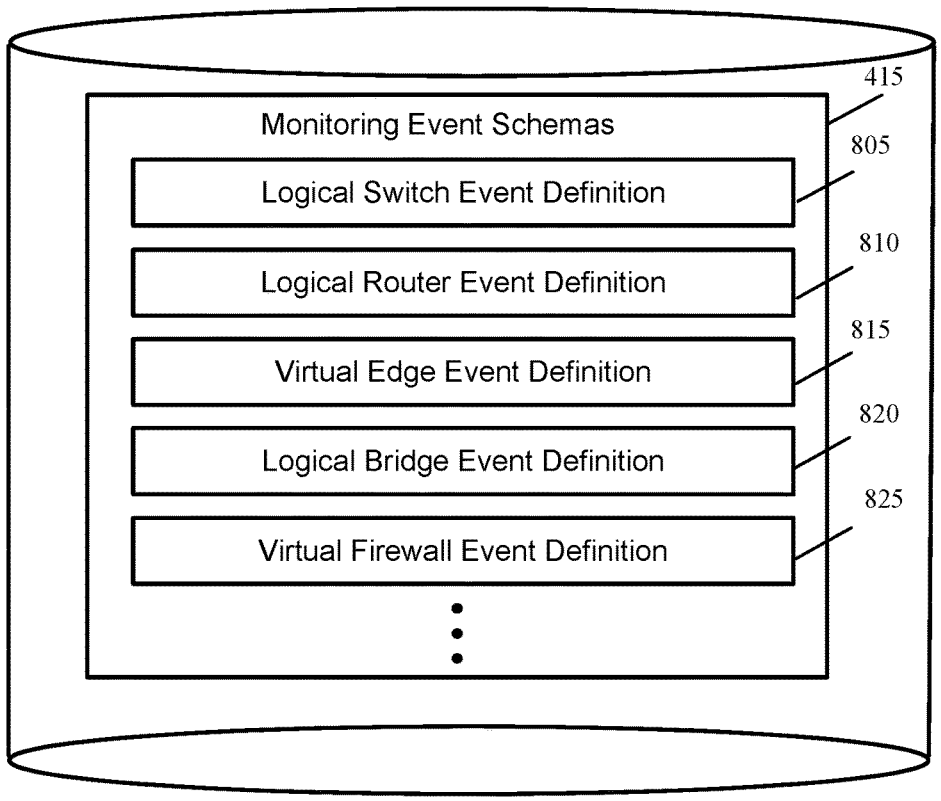
FIG. 8 conceptually illustrates examples of the monitoring events schemas that are used in some embodiments.

FIG. 8 conceptually illustrates examples of the monitoring events schemas that are used in some embodiments. As shown, the monitoring events schemas 415 include logical switch event definition schema 805, logical router event definition schema 810, virtual edge event definition schema 815, virtual firewall event definition schema 820, logical bridge event definition schema 825, etc.

Each monitoring schema defines an event that is monitored on a host and reported back to the network control cluster by the agent on the host. The following are examples of several schemas for different monitoring events in some embodiments.

```
<event>
    <eventType>MachineConnectedToLogicalSwitch</eventType>
    <data>
        <logicalSwitchId>21</logicalSwitchId>
        <logicalSwitchPort>9</logicalSwitchPort>
        <machineId>77</machineId>
        <interface>nic-5</interface>
    </data>
</event>
```

The above schema defines an event that monitoring for a device to be connected to a particular port of a logical switch.

```
<event>
    <eventType>MachineDisconnectedFromLogicalSwitch</eventType>
    <data>
        <logicalSwitchId>21</logicalSwitchId>
        <machineId>77</machineId>
    </data>
</event>
```

The above schema defines an event that monitoring for a device to be disconnected from a logical switch.

Referring back to FIG. 4, the virtual network abstraction layer includes a set of logical device and logical service monitoring interfaces 420. The monitoring interfaces are uses to send status and reports or different logical devices and services to the agent 490. The agent in turn forwards the status and reports to the virtual network controller cluster 205.

Figure 9:
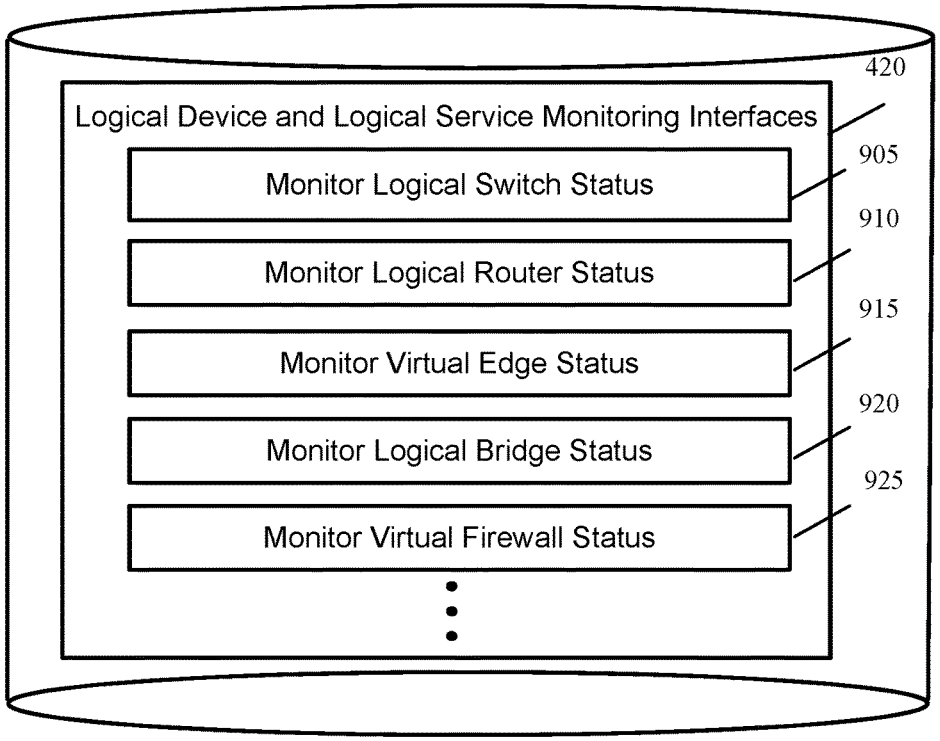
FIG. 9 conceptually illustrates examples of the monitoring interface APIs that are used in some embodiments.

FIG. 9 conceptually illustrates examples of the monitoring interface APIs that are used in some embodiments. As shown, the logical device and logical service monitoring interfaces 420 include a set of APIs 905 for monitoring logical switches status. The control interfaces 420 also includes a set of APIs 910 for monitoring logical routers status. The control interfaces 420 further includes a set of APIs 915 for monitoring virtual edges status. The control interfaces 420 also includes a set of APIs 920 for monitoring logical bridges status. The control interfaces 420 further includes a set of APIs 925 for monitoring virtual firewalls status.

As described above, agent 490 includes a set of components 425 that are common for all platforms. For instance, the agent components that interact between each agent on different hosts and the virtual network controller cluster 205 utilize the same set of commands and the same protocol to interface with the controller cluster regardless of the virtualization software or the network virtualization platform used by the host.

On the other hand, different hosts may have different logical device implementations. Each logical device implementation can have a different network configuration interface 441-444. The network configuration interfaces are utilized by the agent 490 to interact with the logical device implementations on each particular type of host. In the example of FIG. 4, network configuration interfaces 441-442 are used for different network virtualization platforms while network configuration interfaces 443-444 are used for different physical Top of Rack (ToR) switches. In a ToR architecture, the devices are connected to one or more switches that are installed in the rack. The network configuration interfaces in some embodiments are provided by the vendors that implement each network virtualization platform used by each host. In addition, the agent 490 may require one or more network virtualization platform adaptor 430 to interface with different network configuration interfaces.

Figure 10:
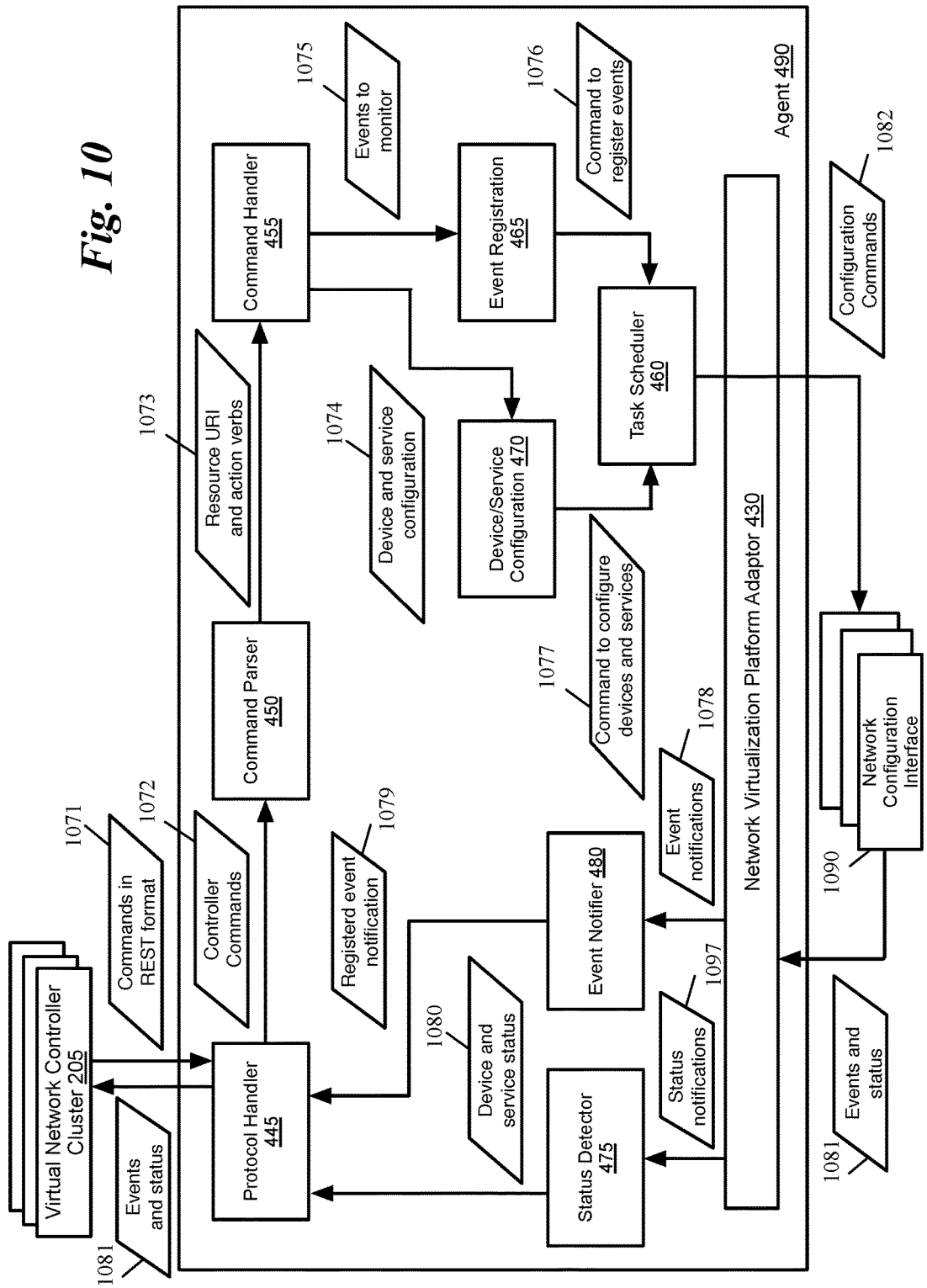
FIG. 10 conceptually illustrates different components of an agent in some embodiments.

FIG. 10 conceptually illustrates different components of an agent in some embodiments. As shown, the agent includes a protocol handler 445, a command parser 450, a command handler 455, a task scheduler 460, an event registration 465, a device and service configuration component 470, a status detector 475, an event notifier 480, and a network virtualization platform adaptor 430.

The protocol handler 445 provides a communication interface between the agent and the virtual network controller cluster. For instance, in the embodiments that use REST APIs, the protocol handler is a REST service provider. The protocol handler receives commands 1071 in REST format (or in the format of any other protocol used between the virtual network controller cluster 205 and the agent 490). The REST commands in some embodiments are sent to the agent over an underlying protocol such as hypertext transfer protocol (HTTP).

Once a command is received from the controller cluster by the protocol handler, the command 1072 is passed to the command parser 450. The command parser 450 parses incoming commands and identifies resources and actions specified in each command. Once the command parser identifies different components of a command, the command parser sends the identification of resources and the required actions to the command handler 455. For instance, in the embodiments that use REST APIs, the command parser identifies the resource URI and action verbs 1073 in the REST command and sends them to the command handler 455.

Command handler 455 analyses the resources and actions specified by the controller cluster and identifies the requested actions for each device and service (e.g., create, read, update, delete actions collectively referred herein as device and service configuration). The command handler sends the required device and service configurations 1074 to the device and service configuration component 470.

The command handler also sends events 1075 that the controller cluster needs to monitor to event registration 465. The controller cluster can register for different events to get notified when a device or service is created, deleted, or has updated status or reports. The event registration component 465 creates commands 1076 that are recognized by the network configuration interfaces 1090 to register for these events with the virtual network platform used by the host.

The device and service configuration component 470 creates commands 1077 to configure the logical devices (e.g., MFEs 261-265 shown in FIG. 2) to create, read, update, or delete different devices and services. These commands are recognized by the network configuration interfaces 1090. For instance, the device and service configuration component specifies the input/output ports and IP addresses of tunnels to implement an overlay network. Event registration 465 and device and service configuration component 470 send the commands 1076 to register events and the commands 1077 to configure different devices and services to the task scheduler 460. Task scheduler 460 schedules different tasks (such as configuration commands 1082) that are required to be performed in order to create, read, update, or delete different devices or services as well as registering for event notifications.

The event notifier 480 receives event notifications 1078 from the network configuration interfaces 1090. The event notifier matches the received event notifications with the events that are registered by the controller cluster. The event notifier 480 sends the registered event notifications 1079 to protocol handler 445. The event notifier may also notify other hosts of the occurrence of different events.

The status detector 475 receives the status 1097 of different devices and services from the network configuration interfaces 1090. The status detector 475 sends the device and service status 1080 to the protocol handler 445. The protocol handler sends the event notifications and device/service status 1081 to virtual network controller cluster 205.

The network virtualization platform adaptor 430 in some embodiments provides the customized interface that is required by the agent to interact with different network configuration interfaces 1090. In other embodiments, the interface between the agent and the network configuration interfaces is uniform (e.g., follows a pre-determined set of rules and formats). In these embodiments, the network configuration interfaces used by each host provide the necessary interface between the agent and the network virtualization platform used by the host to exchange commands, status, and reports between the agent and the platform. These embodiments do not use the network virtualization platform adaptor 430 (or the adaptor in these embodiments is pass through).

Figure 11:
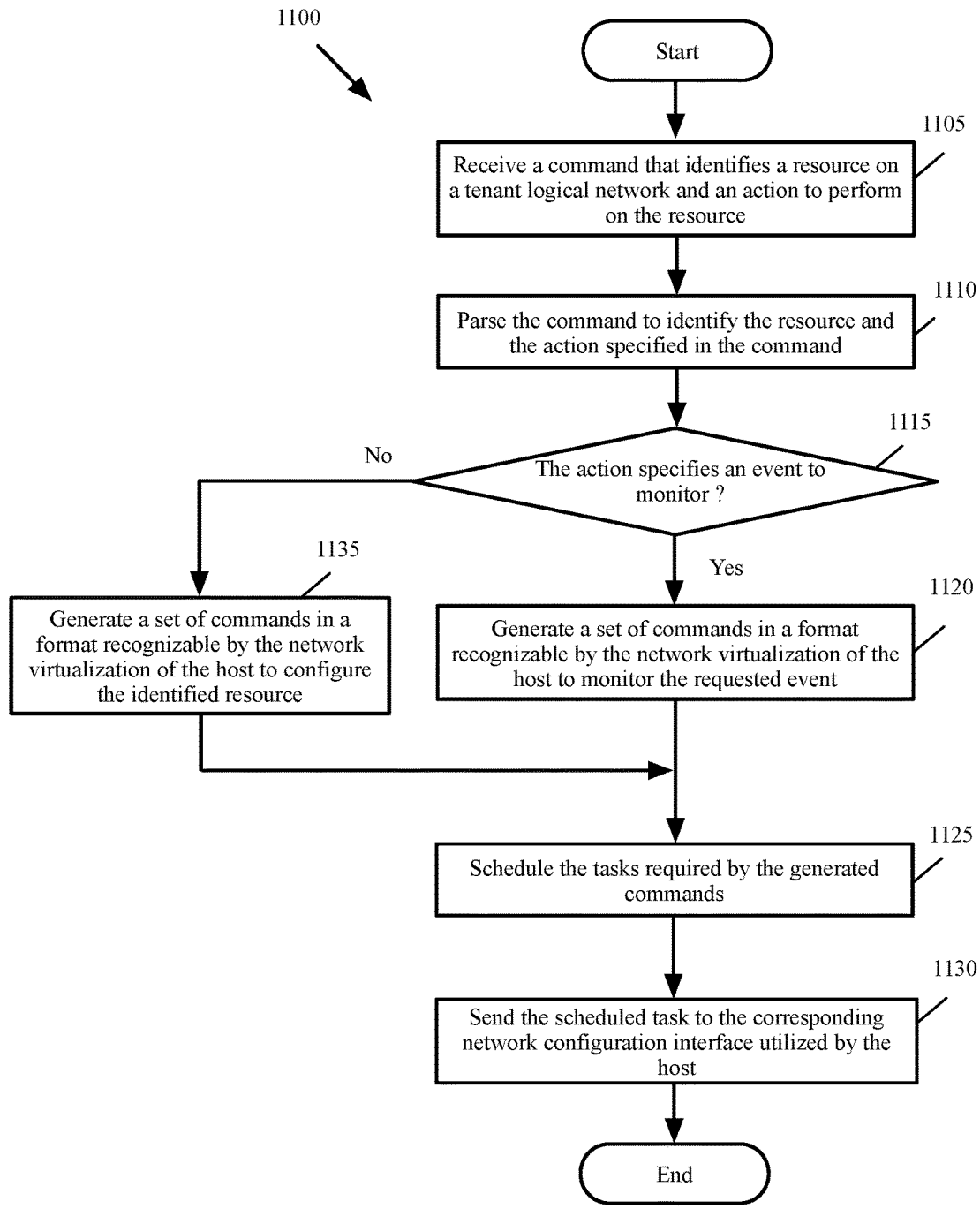
FIG. 11 conceptually illustrates a process for configuring a logical network in some embodiments.

FIG. 11 conceptually illustrates a process 1100 for configuring a logical network in some embodiments. Process 1100 is described by referencing different items shown in FIG. 10. The process is performed by an agent such as agent 490 in FIG. 4 in some embodiments. As shown, the process receives (at 1105) a command that identifies a resource on a tenant logical network and an action to perform on the resource. For instance, the process receives command 1071 at protocol handler 455 of agent 490 from a virtual network controller in the virtual network controller cluster 205. The command is specified in a high level format that is independent of the specific formats required by different network virtualization software utilized by different host on the tenant logical network.

The process then parses (at 1110) the command to extract the resource identification and the action to perform on the resource. For instance, the process provides the resource URI and action verb 1073 by the command parser 450 of the agent 490. The process then determines (at 1115) whether the command is for monitoring an event or configuring a logical device or logical service. If the command is configuring a logical device or logical service, the process proceeds to 1135, which is described below.

Otherwise, the process generates (at 1120) a set of commands in a format that is recognizable by the network virtualization of the host to monitor the requested event. For instance, the event registration 465 of the agent 490 generates the commands 1075 to register the event. The process then schedules (at 1125) the tasks required by the generated commands. For instance, the task scheduler 460 schedules a set of tasks that are required to register the event with the network virtualization software utilized by the host. The process then sends (at 1130) the scheduled task to the network configuration interface utilized by the host to configure the network on the host. The process then ends.

When the process determines that the action required by the virtual network controller is not to monitor event, the process determines that the command is to configure a logical device or a logical service on the tenant logical network. The process generates (at 1135) a set of commands in a format that is recognizable by the network virtualization of the host to configure the identified resource. For instance, the device and service configuration component 470 generates the commands 1077 to configure the identified resource. The process then proceeds to 1125, which was described above.

Figure 12:
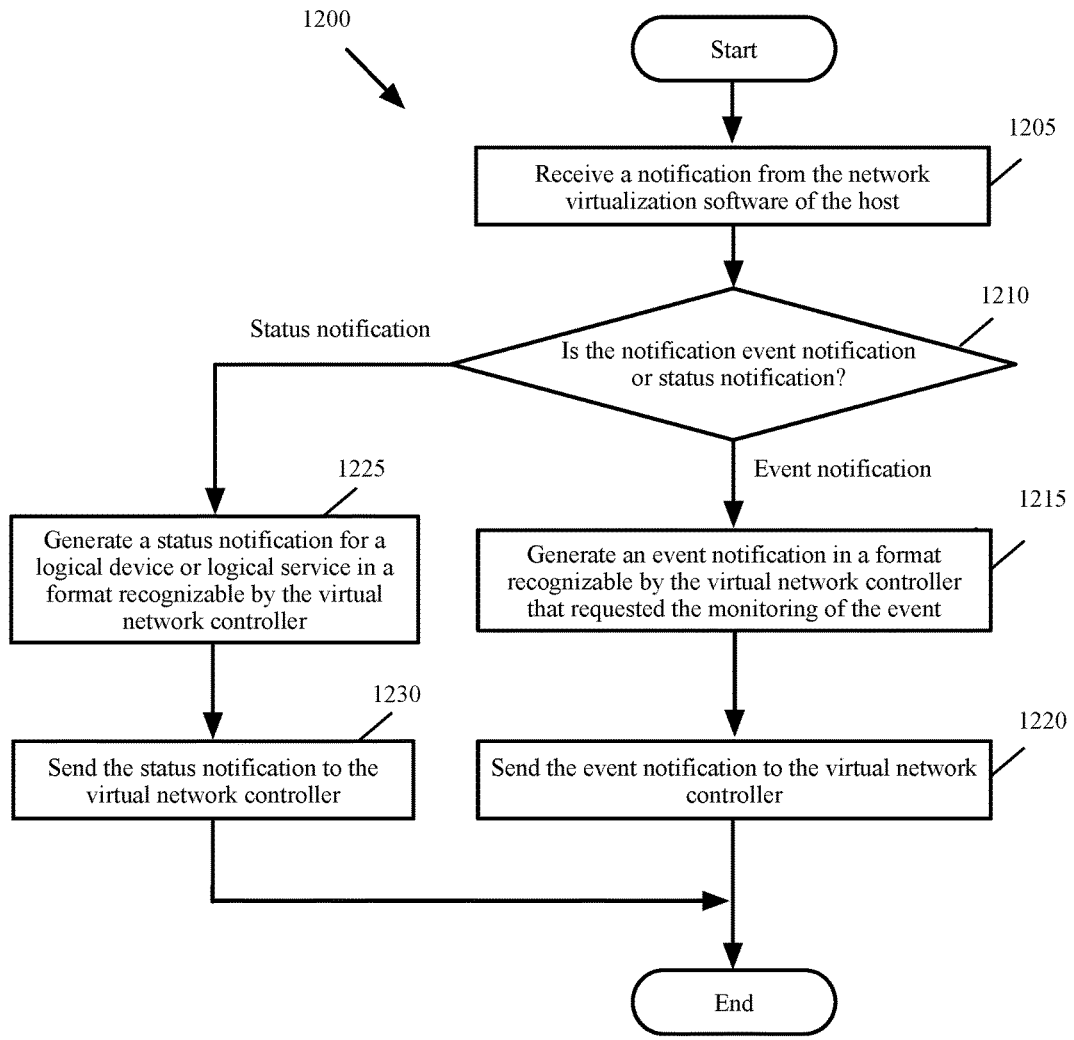
FIG. 12 conceptually illustrates a process for providing event notification and status information for a logical network in some embodiments.

FIG. 12 conceptually illustrates a process 1200 for providing event notification and status information for a logical network in some embodiments. Process 1200 is described by referencing different items shown in FIG. 10. The process is performed by an agent such as agent 490 in FIG. 4 some embodiments. As shown, the process receives (at 1205) a notification from the network virtualization software of the host. The process then determines (at 1210) whether the notification is an event notification or a status notification. When the notification is an event notification, the process generates (at 1215) an event notification in a format that is recognizable by the virtual network controller that requested the monitoring of the event. For instance, the process receives the event notification 1078 by the event notifier 1080 of the agent 490 and generates registered event notification 1079. The process then sends (at 1220) the event notification to the virtual network controller. The process then ends.

When the process determines that the notification is a status notification, the process generates (at 1225) a status notification for a logical device or logical service in a format that is recognizable by the virtual network controller. For instance, the process receives the status notification 1079 by the status detector 475 of the agent 490 and generates device or service status 1080. The process then sends (at 1230) the status notification to the virtual network controller. The process then ends.

Figure 13:
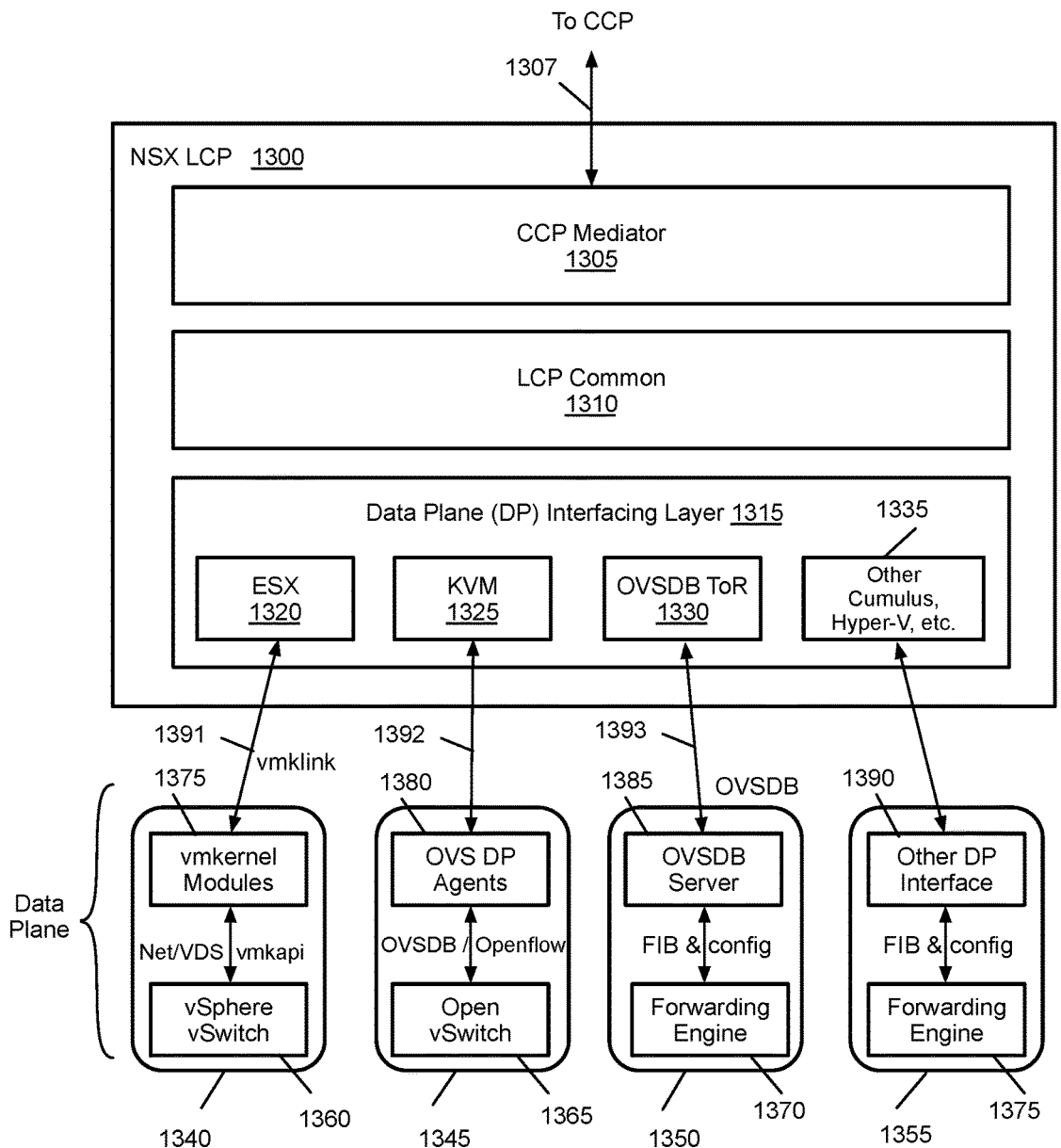
FIG. 13 conceptually illustrates an implementation of the system of FIG. 4 in some embodiments.

FIG. 13 conceptually illustrates an implementation of the system of FIG. 4 in some embodiments. The example of FIG. 13 illustrates a layered LCP architecture of NSX®, which is a virtual networking and security software product family provided by VMware®. In some embodiments, the virtual network cluster 205 of FIGS. 3 and 4 form the central control plane (CCP) the network. The control plane controls signaling traffic and routing of the network.

The network abstraction layer described above by reference to FIGS. 3 and 4 is provided by a local control plane (LCP) that runs (e.g., as a daemon) on every transport node (i.e., nodes such as hosts that hold forwarding engines and implement the data plane). The data plane is the part of the network that carries data packets traffic.

The network abstraction layer acts as a data plane interfacing layer in the LCP that programs forwarding engines and allows different data planes to develop their own implementations. In this way, most parts (management plane, controller cluster, and other LCP code) of the network virtualization stack is kept identical across devices and enables the same feature set (as long as the features are supported by the data plane) on these devices through a unified API and workflow.

As shown in FIG. 13, the LCP 1300 is divided into three layers: CCP mediator 1305 that talks to CCP and terminates the CCP-LCP protocol; LCP common 1310 that is independent of CCP protocols and data plane (DP) implementation; and the DP interfacing layer 1315 that programs a specific data plane implementation.

The CCP mediator 1305 performs similar operations as described by reference to protocol handler 445 component of the agent 490 in FIGS. 4 and 10 and provides a communication interface (as shown by 1307) between the CCP and LCP. The CCP mediator 1305 allows the CCP (which includes the virtual network controller cluster 205) to work with different data plane implementation without the need for being aware of the particular network virtualization software that is used by different hosts on the logical network. In addition, the architecture of FIGS. 3-4 and 13 allows the LCP to communicate with different CCP implementations by using different CCP mediators without the need to change the other components of the LCP.

The LCP common 1310 performs similar operations as components 450-480 of the agent as described above by reference to FIGS. 4 and 10. The DP interfacing layer 1315 provides functions similar to network virtualization adaptor 430 in FIGS. 4 and 10. The DP interfacing layer 1315 includes a set of customized interfaces used to interact with different network virtualization platforms used by different hosts and devices 1340-1355. In the example of FIG. 13, the DP interfacing layer 1315 includes interfaces 1320-1335 for different virtualization software such as ESX®, KVM, OVSDB Tor, Cumulus, Hyper-V, etc.

The CCP mediator 1305 and LCP common 1310 are kept identical across platforms and data plane implementations while the DP interfacing layer 1315 may have different implementations for different data planes. For instance, on ESX®, a LCP data plane interfacing layer component 1320 communicates with data plane vmkernel (VXLAN®, VDR. etc.) modules 1375 via vmklink sockets (as shown by 1391).

On KVM, a DP interfacing layer component 1325 communicates with NSX® data plane. NSX® data plane on KVM includes several data plane agents 1380 which program open vSwitch (OVS) 1365 via Open vSwitch Database Management Protocol (OVSDB®) and OpenFlow™, and the LCP DP interfacing layer component 1325 communicate (as shown by 1392) with these DP agents 1380. On NSX® Edge™, similar to the KVM, the LCP DP interfacing layer talks to the Edge data plane agents that program the Edge forwarding engine. NSX® Edge™ (not shown) provides network edge security and gateway services for a virtualized network.

On a ToR switch 1370 that supports OVSDB®, the LCP DP interfacing layer component 1330 can manipulate (as shown by 1393) the OVSDB® tables of the local OVSDB® server 1385. There are many more physical or virtual switches or other devices 1375 that can be integrated with NSX® the same way, e.g., Hyper-V native vSwitch, Cumulus switches, Linux bridge, Linux net-work appliances, etc. Each of these switches or devices have interfaces 1390 to communicate with the corresponding component 1335 of the DP interfacing layer 1315.

The DP interfacing layer definition in some embodiments is based on high level control plane abstractions (e.g. VIF (virtual interface, aka VNIC), logical port, logical switch and router), policy (e.g. access control list (ACL), quality of service (QoS), mirroring) and forwarding information based (FIB) (e.g., L2 MAC table and L3 route table) expressions. Some embodiments categorize the network devices and define the refined data plane abstraction layers in LCP for different device types and/or data plane functionalities in order to exact more common logics shared by the devices of the same type. Some embodiments standardize and open the abstraction layers to allow hardware vendors or third parties to develop NSX® LCP plug-ins for specific devices or data plane implementations.

II. Electronic System

Many of the above-described features and applications are implemented as software processes that are specified as a set of instructions recorded on a computer readable storage medium (also referred to as computer readable medium).

When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
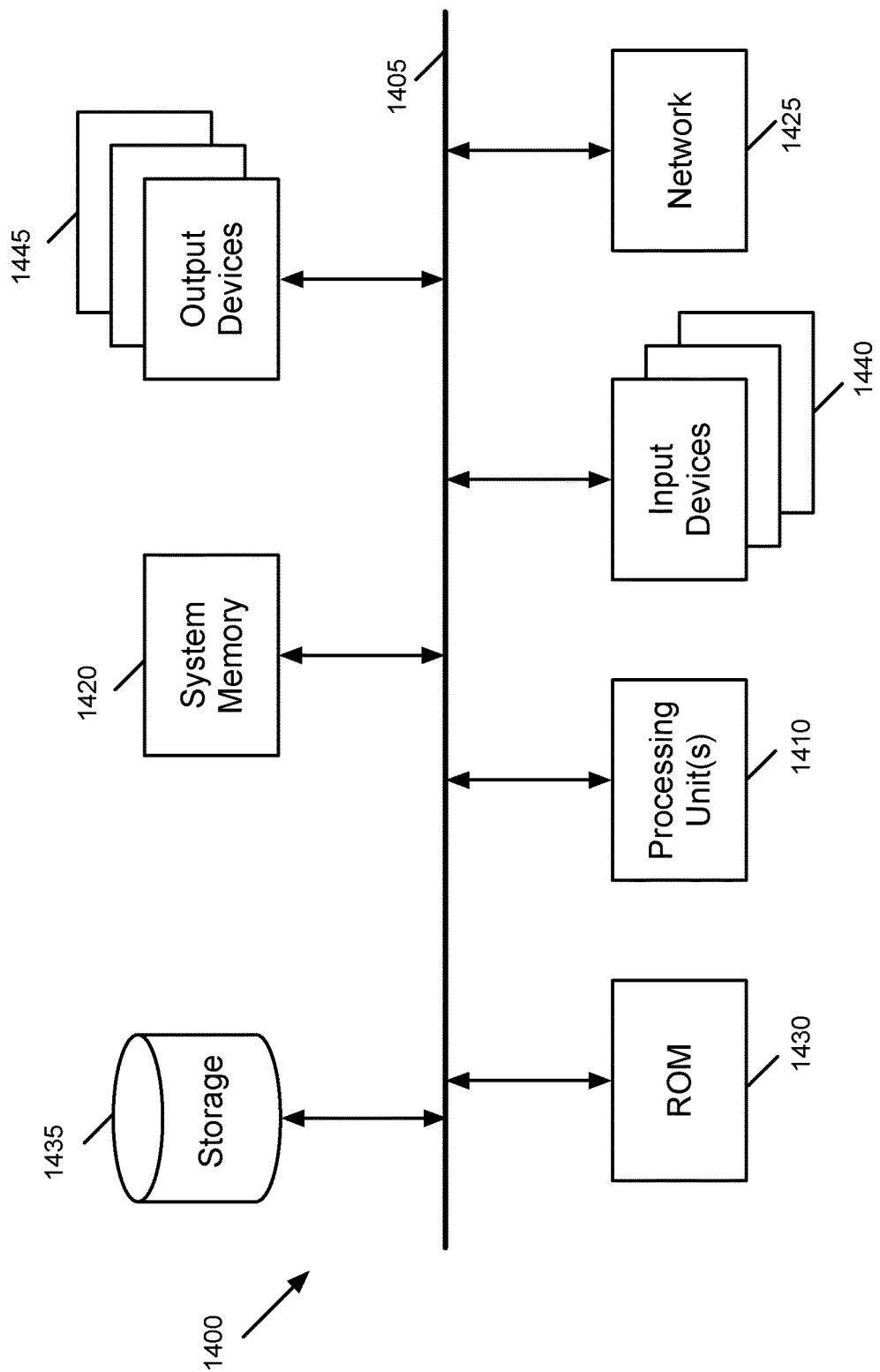
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1420, a read-only memory (ROM) 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such as random access memory.

The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 1 and 11-12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of defining a virtual network across a plurality of physical host computers, the method comprising:
   at an agent executing on a particular host computer that hosts a plurality of data compute nodes (DCNs) belonging to one or more tenant logical networks:
      receiving a command from a network controller that provides commands to a plurality of agents executing on a plurality of different host computers that each host sets of DCNs belonging to one or more tenant logical networks, wherein at least two different host computers execute two different types of network virtualization software provided by two different vendors, the command comprising (i) an identification of a resource associated with a particular tenant logical network by to which a DCN executing on the particular host computer connects and (ii) an action to perform on the identified resource;
      determining a type of network virtualization software executing on the particular host computer;
      translating the received action into a set of configuration commands compatible with the type of network virtualization software executing on the particular host computer; and
      sending the configuration commands to a network configuration interface on the host computer to perform the action on the identified resource.

2. The method of claim 1, wherein the network controller is not compatible with the different types of network virtualization software executing on the plurality of host computers.

3. The method of claim 1, wherein the agent and the network controller communicate through an application programming interface (API) that is independent of the type of network virtualization software executing on the particular host computer.

4. The method of claim 3, wherein the API is a representational state transfer (REST) API.

5. The method of claim 1, wherein the resource identified by the command is one of a logical router, a logical switch, a logical bridge, and a virtual firewall associated with the particular tenant logical network.

6. The method of claim 1, wherein the action specified by the command is one of a monitor command, a read command, and an update command.

7. The method of claim 1, wherein each DCN in the plurality of DCNs is one of a virtual machine and a container that runs executes on top of an operating system of the particular host computer.

8. The method of claim 1, wherein the particular host computer is a first host computer, the agent is a first agent, the type of network virtualization software is a first type of network virtualization software, and the set of configuration commands is a first set of configuration commands, the method further comprising:
   at a second agent executing on a second host computer that hosts a second plurality of DCNs belonging to one or more tenant logical networks:
      receiving said command from the network controller, wherein a DCN executing on the second host computer connects to the particular tenant logical network with which the resource identified by the command is associated;
      determining that network virtualization software executing on the second host computer is a second type of network virtualization software that is different than the first type of network virtualization software executing on the first host computer;
      translating the action of said command into a second set of configuration commands compatible with the second type of network virtualization software by executing on the second host computer; and
      sending the second set of configuration commands to a network configuration interface on the second host computer to perform the action on the identified resource on the second host computer, wherein the second set of configuration commands is different than the first set of configuration commands.

9. A non-transitory computer readable medium storing a program for an agent which when executed by at least one processing unit of a particular physical host computer defines a virtual network across a plurality of physical host computers, wherein the particular host computer hosts a plurality of data compute nodes (DCNs) belonging to one or more tenant logical networks, the program comprising sets of instructions for:
  receiving a command from a network controller that provides commands to a plurality of agents executing on a plurality of different host computers that each host sets of DCNs belonging to one or more tenant logical tenant networks, wherein at least two different host computers execute two different types of network virtualization software provided by two different vendors, the command comprising (i) an identification of a resource associated with a particular tenant logical network to which a DCN executing on the particular host computer connects and (ii) an action to perform on the identified resource;
  determining a type of network virtualization software executing on the particular host computer;
  translating the received action into a set of configuration commands compatible with the type of network virtualization software executing on the host computer; and
  sending the configuration commands to a network configuration interface on the host computer to perform the action on the identified resource.

10. The non-transitory computer readable medium of claim 9, wherein the network controller is not compatible with the different types of network virtualization software executing on the plurality of host computers.

11. The non-transitory computer readable medium of claim 9, wherein the agent and the network controller communicate through an application programming interface (API) that is independent of the type of network virtualization software executing on the particular host computer.

12. The non-transitory computer readable medium of claim 11, wherein the API is a representational state transfer (REST) API.

13. The non-transitory computer readable medium of claim 9, wherein the resource identified by the command is one of a logical forwarding device and a logical service machine associated with the particular tenant logical network.

14. The non-transitory computer readable medium of claim 9, wherein the action specified by the command is one of a create command, a read command, an update command, a monitor command, and a delete command.

15. The non-transitory computer readable medium of claim 9, wherein each DCN in the plurality of DCNs is one of a virtual machine and a container that runs executes on top of an operating system of the particular host computer.

16. The non-transitory computer readable medium of claim 9, wherein the particular host computer is a first host computer, the agent is a first agent, the type of network virtualization software is a first type of network virtualization software, and the set of configuration commands is a first set of configuration commands, wherein a second agent operating on a second host computer that hosts a second plurality of DCNs belonging to one or more tenant logical networks:
  receives said command from the network controller, wherein a DCN executing on the second host computer connects to the particular tenant logical network with which the resource identified by the command is associated;
  determines that network virtualization software executing on the second host computer is a second type of network virtualization software that is different than the first type of network virtualization software executing on the first host computer;
  translates the action of said command into a second set of configuration commands compatible with the second type of network virtualization software executing on the second host computer; and
  sends the second set of configuration commands to a network configuration interface on the second host computer to perform the action on the identified resource on the second host computer, wherein the second set of configuration commands is different than the first set of configuration commands.

17. A system comprising:
  a set of processing units; and
  a non-transitory computer readable medium storing a program for an agent which when executed by at least one processing unit of a physical host computer defines a virtual network across a plurality of physical host computer, wherein the particular host computer hosts a plurality of data compute nodes (DCNs) belonging to one or more tenant logical networks, the program comprising sets of instructions for:
  receiving a command from a network controller that provides commands to a plurality of agents executing on a plurality of different host computers that each host sets of DCNs belonging to one or more tenant logical networks, wherein at least two different host computers execute two different types of network virtualization software provided by two different vendors, the command comprising (i) an identification of a resource associated with a particular tenant logical network to which a DCN executing on the particular host computer connects and (ii) an action to perform on the identified resource;
  determining a type of network virtualization software executing on the particular host computer;
  translating the received action into a set of configuration commands compatible with the type of network virtualization software executing on the particular host computer; and
  sending the configuration commands to a network configuration interface on the host computer to perform the action on the identified resource.

18. The system of claim 17, wherein the network controller is not compatible with the different types of network virtualization software executing on the plurality of host computers.

19. The system of claim 17, wherein the agent and the network controller communicate through a representational state transfer (REST) application programming interface (API) that is independent of the type of network virtualization software executing on the particular host computer.

20. The system of claim 17, wherein the resource identified by the command is one of a logical forwarding device and a logical service machine associated with the particular tenant logical network.

21. The system of claim 17, wherein the action specified by the command is one of a create command, a read command, an update command, a monitor command, and a delete command.

22. The method of claim 1, wherein the host computer performs the action on the identified resource by one of (i) creating a logical resource associated with the particular tenant logical network and (ii) deleting a logical resource associated with the particular tenant logical network.

23. The method of claim 1, wherein the network configuration interface is a driver provided by the vendor of the network virtualization software executing on the host computer for receiving commands from the agent and translating the received commands into configuration commands compatible with the network virtualization software executing on the particular host computer.

24. The method of claim 1, wherein the action is a monitor command, the method further comprising:
   at the agent:
      receiving a first notification from the network configuration interface;
      generating a second notification in a format recognizable by the network controller based on the received first notification; and
      sending the second notification to the network controller,
   wherein the first notification is one of an event notification and a status notification for the identified resource.

* * * * *